United States Patent
Jiang et al.

(10) Patent No.: US 10,372,013 B2
(45) Date of Patent: Aug. 6, 2019

(54) DYNAMIC PHASE SHIFT COMPENSATION FOR FREE CARRIER EFFECT PHOTONIC SWITCHES

(71) Applicant: Huawei Technologies Co., Ltd., Shenzhen (CN)

(72) Inventors: Jia Jiang, Ottawa (CA); Dominic John Goodwill, Ottawa (CA); Eric Bernier, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 157 days.

(21) Appl. No.: 15/096,589

(22) Filed: Apr. 12, 2016

(65) Prior Publication Data

US 2017/0293200 A1    Oct. 12, 2017

(51) Int. Cl.
| | | |
|---|---|---|
| G02F 1/035 | (2006.01) | |
| G02F 1/295 | (2006.01) | |
| G02B 6/26 | (2006.01) | |
| G02F 1/313 | (2006.01) | |

(52) U.S. Cl.
CPC .......... *G02F 1/3136* (2013.01); *G02F 1/3138* (2013.01); *G02F 2203/21* (2013.01)

(58) Field of Classification Search
CPC .... G02F 1/2257; G02F 1/3133; G02F 1/3132; G02F 1/3134; G02F 1/3136; G02F 1/3137; G02F 1/3138
USPC ........... 385/8, 14, 16, 17, 31, 41, 42, 44, 45
See application file for complete search history.

(56) References Cited

U.S. PATENT DOCUMENTS

| | | | |
|---|---|---|---|
| 2004/0213508 A1 | 10/2004 | Shahar et al. | |
| 2007/0047964 A1* | 3/2007 | Ooi ........................ | H04B 10/66 398/147 |
| 2009/0226184 A1* | 9/2009 | Nishihara .......... | H04B 10/5051 398/188 |
| 2015/0271576 A1 | 9/2015 | Svilans et al. | |
| 2015/0293427 A1* | 10/2015 | Goi ........................ | G02F 1/025 385/3 |

FOREIGN PATENT DOCUMENTS

| | | |
|---|---|---|
| CN | 1670556 A | 9/2005 |
| CN | 101630975 A | 1/2010 |

(Continued)

OTHER PUBLICATIONS

Zhou, Haifeng, et al., "Performance influence of carrier absorption to the Mach-Zehnder-interference based silicon optical switches," Optics Express, vol. 17, No. 9, pp. 7043-7051, 2009.

(Continued)

*Primary Examiner* — Kaveh C Kianni
*Assistant Examiner* — Hung Q Lam

(57) ABSTRACT

Monitoring output power levels of a carrier-effect based switching cell allows phase errors resulting from driving a PIN or PN junction of the switching cell to be dynamically compensated for. The compensation may also allow for compensating of phase errors resulting from the phase imbalance of input couplers as well as phase errors from the waveguide due to fabrication variations. By dynamically compensating for phase errors caused by the driving of the PIN or PN junction, the extinction ratio of the carrier-effect based switching cell can be increased.

9 Claims, 5 Drawing Sheets

(56) References Cited

FOREIGN PATENT DOCUMENTS

CN    101681076 A    3/2010
CN    103842895 A    6/2014

OTHER PUBLICATIONS

Lee, Benjamin G., et al., "Four- and Eight-Port Photonic Switches Monolithically Integrated with Digital CMOS Logic and Driver Circuits," 2013 Optical Fiber Communication Conference and Exposition and the National Fiber Optic Engineers Conference (OFC/NFOEC), pp. 1-3, 2013.
Xing, Jiejiang, et al., "Nonblocking 4×4 silicon electro-optic switch matrix with push-pull drive," Optics Letters, vol. 38, No. 19, pp. 3926-3929, 2013.
White, Whitney R., et al., "Manufacture of Perfluorinated Plastic Optical Fibers," Optical Fiber Communication Conference, 2004.
White, Whitney R., "Perfluorinated Graded Index Plastic Optical Fiber GigaPOF®", Optical Fiber Communication Conference, 2010.
International Search Report for PCT/CN2016/079577 dated Jan. 11, 2017.

\* cited by examiner

DYNAMIC PHASE SHIFT COMPENSATION FOR FREE CARRIER EFFECT PHOTONIC SWITCHES

TECHNICAL FIELD

The current disclosure relates to photonic switches and in particular to photonic switches based on the free-carrier effect.

BACKGROUND

All-optical switches are emerging to offer advantages of speed, compactness and low cost per bit as the all-optical switches eliminate optical-electrical-optical (OEO) conversion. The all optical switches may be used in data center applications and fixed network telecommunication applications. Photonic integrated circuits (PIC) technology can integrate optical circuit components and electrical circuit components on a compact chip. Silicon-on-insulator (SOI) offers a platform that can provide compactness and high levels of function integration due to silicon's large index contrast.

High speed photonic switches may be based on the free carrier effect in a silicon waveguide comprising a PN and/or PIN junction. The response speed of free carrier effect-based photonic switches may be in the order of nano-seconds. The free carrier effect-based switch is typically based on a Mach-Zehnder Interference (MZI) configuration. For a 1×2 or 2×2 MZI switch, a π phase shift between the propagating light in different arms of the MZI structure is required to be applied in order to switch the light from one output to the other output of the MZI switch.

The extinction ratio of MZI switches depends upon a phase difference of the lights in the two arms at the output coupler in the MZI switch. MZI switches using the free-carrier effect may suffer from phase errors, which may result from phase imbalances of the input coupler and/or output coupler, variation of the optical absorption between the two arms of the MZI switch, and thermal-optic (TO)-effect due to driving on the PN and/or PIN junction.

SUMMARY

In accordance with the present disclosure there is provided a photonic switch comprising: a plurality of photonic switch cells connected between a plurality of switch inputs and switch outputs, each of the plurality of photonic switch cells comprising: an input coupler; an output coupler; a pair of optical paths connected between the input coupler and the output coupler; a carrier effect region in one of the optical paths, the carrier effect region controlling a refractive index of the optical path based on a switching voltage; a first optical tap monitor at a first output of the output coupler; a second optical tap monitor at a second output of the output coupler; and a phase compensator in one of the optical paths for inducing a phase shift of an optical signal based on an applied time-varying compensating signal; and a phase-shift compensation controller for determining the respective dynamic compensating voltage for each of the plurality of photonic switching cells based on at least one of an output of the first optical tap monitor and an output of the second optical tap monitor of the respective photonic switching cell.

In a further embodiment of the photonic switch, the phase compensator of each of the plurality of photonic switching cells is configured to at least partially compensate for phase errors resulting from driving the carrier effect region of the respective photonic switching cell, whereby an extinction ratio (ER) of the photonic switching cells increases.

In a further embodiment of the photonic switch, the phase compensator of one or more of the plurality of photonic switching cells comprises a thermo-optic (TO) phase shifter.

In a further embodiment of the photonic switch, the carrier effect region comprises a PN junction or a PIN junction.

In a further embodiment, the photonic switch further comprises a second carrier effect region in the other one of the optical paths.

In a further embodiment, the photonic switch further comprises a switch routing controller for determining the respective switching voltage of each of the plurality of photonic switching cells in order to establish optical paths between the switch inputs and outputs.

In a further embodiment of the photonic switch, the time-varying compensating signal has a time constant that is shorter than a hold-time of the photonic switch.

In accordance with the present disclosure there is further provided a method of compensating phase shift errors in a carrier effect based switching cell, the method comprising: detecting a first power level of an optical signal at a first output of the switching cell; determining an amount of phase shift compensation to apply based on the detected first power level of the optical signal at the first output; and applying the determined amount of phase shift compensation to a phase compensator of the switching cell to compensate for phase shift errors in the switching cell.

In a further embodiment, the method further comprises detecting a second power level of an optical signal at a second output of the switching cell; wherein determining the amount of phase shift compensation to apply comprises: determining if the first power level is greater than the second power level; determining the amount of phase shift compensation to apply for increasing a difference between the first power level and the second power level when the first power level is greater than the second power level; and determining the amount of phase shift compensation to apply for increasing a difference between the second power level and the first power level when the first power level is not greater than the second power level.

In a further embodiment, the method further comprises determining which output is active; selecting an optical tap monitor associated with the determined output, the selected optical tap monitor detecting the first power level, wherein determining the amount of phase compensation to apply comprises: determining the amount of phase compensation to apply for maximizing the detected first power level.

In a further embodiment of the method, determining which output is active comprises: determining an input being switched; determining a state of the switching cell; and determining which output is active based on the determined input and the state of the switching cell.

In a further embodiment of the method, increasing the difference between the first power level and the second power level comprises maximizing the difference between the first power level and the second power level and increasing the difference between the second power level and the first power level comprises maximizing the difference between the second power level and the first power level.

In accordance with the present disclosure there is further provided a photonic switching cell comprising: an input coupler; an output coupler; a pair of optical paths connected between the input coupler and the output coupler; a PN junction in one of the optical paths, the PN junction controlling a refractive index of the optical path based on an applied switching voltage; a first optical tap monitor at a first output of the output coupler; a second optical tap monitor at a second output of the output coupler; and a phase compensator in one of the optical paths for inducing a phase shift of an optical signal based on an applied time-varying compensating signal determined based on at least one of an output of the first optical tap monitor and an output of the second optical tap monitor.

In a further embodiment of the photonic switching cell, the phase compensator is configured to at least partially compensates for phase errors resulting from driving the PN junction, whereby an extinction ratio (ER) of the photonic switching cell increases.

In a further embodiment of the photonic switching cell, the phase compensator further compensates for phase errors resulting from at least one of a phase imbalance of the input coupler and a phase error from the waveguide due to fabrication variations.

In a further embodiment of the photonic switching cell, the phase compensator comprises a thermo-optic (TO) phase shifter.

In a further embodiment of the photonic switching cell, the PN junction is a PIN junction.

In a further embodiment, the photonic switching cell further comprises a second PN junction in the other one of the optical paths.

BRIEF DESCRIPTION OF THE DRAWINGS

Embodiments are described herein with reference to the appended drawings, in which.

DETAILED DESCRIPTION

A fast photonic switch is described herein that includes dynamic compensation of the phase shift in order to compensate for errors in the phase shift, which may result from physical imperfections or fabrication errors. The dynamic compensation may also provide phase compensation for phase errors resulting from driving the photonic switch. The dynamic phase compensation is used to optimize the switch output extinction ratio. As described in detail below, optical power tap monitors at each arm of the switch cell can be used to determine an amount of phase shift error to be compensated for in order to maximize an extinction ratio for the switch cell. A compensating phase shift is produced using a thermo-optic phase shifter in at least one arm of the MZI switch. The dynamic phase compensation described herein provides a carrier-effect based-photonic switch capable of achieving high extinction ratios, without significantly impacting or changing the switch architecture.

Figure 1:
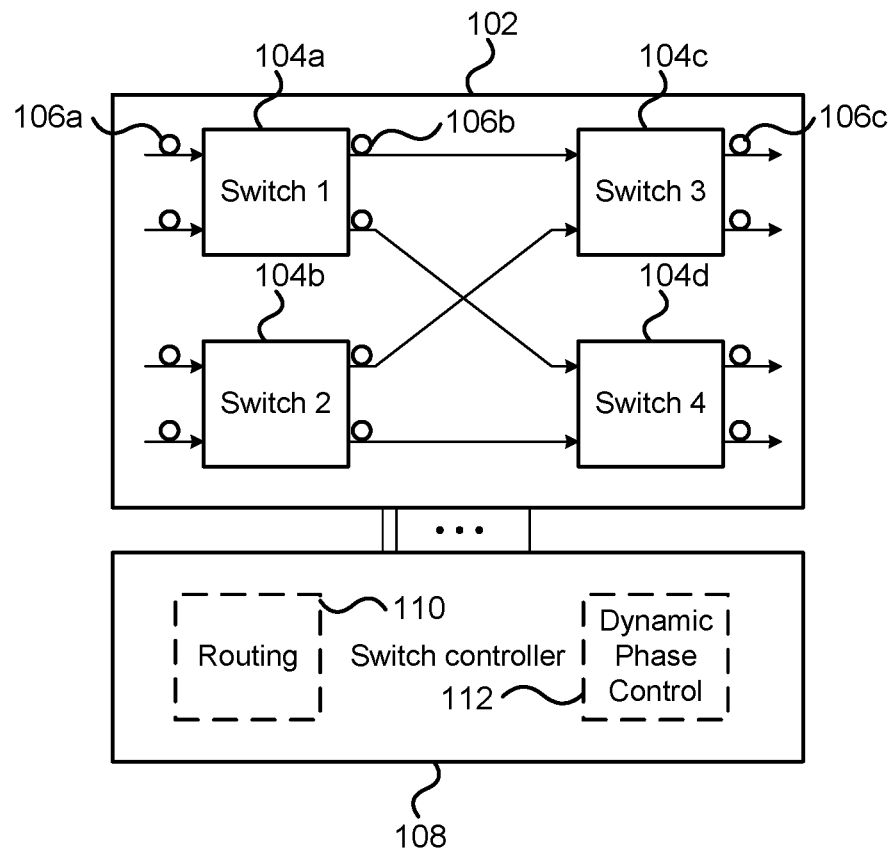
FIG. 1 depicts a dynamically compensated free-carrier effect based switch matrix.

FIG. 1 depicts an example of a dynamically compensated free-carrier effect based 4×4 photonic switch. The photonic switch 100 comprises a switching matrix 102 comprising a plurality of individual switching cells 104a, 104b, 104c, 104d (referred to collectively as switching cells 104). The individual switching cells 104 may be a Mach-Zehnder interferometer (MZI) based switching cell that uses either carrier injection or carrier depletion in order to introduce a phase shift between the light in the two arms of the MZI switching cell. In addition to the switching cells 104, the switching matrix 102 may further comprise a plurality of optical tap monitors, depicted as small circles 106a, 106b, 106c (referred to collectively as optical tap monitors 106) located at different points within the switching matrix 102. The optical tap monitors 106 may be located at the inputs and outputs of the switching cells. A single optical tap monitor, for example optical tap monitor 106b, may be provided between two switching cells optically coupled by a waveguide, such as at an output of one switching cell and an input of a second switching cell that is optically coupled to the first output. The optical tap monitors 106 monitor the power of the optical signal at the particular location of the optical tap monitor. The signals from the optical tap monitors 106 may be provided to a switch controller 108. The switch controller 108 provides routing control functionality 110 that determines the routing path for optical signals through the switch matrix. The particular routing algorithm, or algorithms, used by the routing functionality 110 may depend upon a number of factors, including the particular architecture of the switching matrix 102. The switch controller 108 further provides dynamic phase control functionality 112 that dynamically determines a phase shift to apply to the different switching cells 104 in order to compensate for phase shift errors that may result from driving the switching cells 104 to provide the switching function of the matrix. The signals from the optical tap monitors 106 may also be provided to the dynamic phase control functionality for use in determining the phase shift compensation to apply to the individual switching cells 104 in order to compensate for dynamic phase errors and possibly non-dynamic or constant phase errors. The dynamic phase errors may be a result of the operation of the switching cells, while the constant phase errors may arise from the imbalance of the input coupler of the switch cell 104 and other errors caused by the fabrication of the switch matrix 102.

In a free-carrier effect based switching cell, phase error can arise from a number of different sources. Broadly the phase error may be considered as being a constant phase error, which arises out of the physical structure of the switching cell. These constant phase errors may arise from imperfections in the fabrication of the switching cell including the input coupler, which may be a multi-mode interferometer (MMI), a directional coupler, a Y-junction splitter or other types of possible input couplers. The constant phase error may be compensated for by applying a constant counteracting phase adjustment to a signal in one, or both, of the arms of the switching cell.

In addition to the constant phase error, free-carrier effect switching cells also experience phase errors resulting from the operation of the switching cell. That is, applying an electrical signal to switch the state of the switching cell can induce an unwanted phase shift. Free-carrier effect switches may experience a phase error from a loss imbalance due to carrier absorption between a driving arm and an idle arm of the MZI structure. When an electrical voltage is applied to one arm of the MZI structure, carriers inject, or deplete, from the arm and causes variation in the optical absorption, which induces the loss imbalance. Further, free-carrier effect based switching cells may also suffer from temperature induced phase errors. Driving a PIN, or PN, junction in one arm of the switching cell will create a temperature difference between the driving arm and idle arm, resulting in a temperature dependent phase error. Although the dynamic phase shift errors are described above as resulting from differences between a driving arm and an idle arm, it is possible to have carrier-effect regions present in both arms, and as such both arms may be driven during operation. However, even when both arms of the MZI structure are driven, there may be dynamic phase errors by driving the two arms differently from each other.

The dynamic phase control functionality 112 can compensate for both the constant and dynamic phase errors. The compensation of the constant phase errors may be done by determining the compensation required and setting a fixed compensation amount that is constantly applied. The dynamic compensation will vary depending on the operation of the switching cell and is applied in addition to the fixed compensation amount. That is, the total phase shift compensation to be applied may be viewed as the sum of the phase shift compensation for constant phase shift errors and the dynamic phase shift compensation for dynamic phase shift errors. The dynamic phase control functionality 112 may receive signals from the optical tap monitors 106 that are indicative of an amount of power in a respective input or output of a switching cell. The phase shift error resulting from both the constant and dynamic phase shift errors worsens a contrast ratio between outputs of the switching cell. Accordingly, the dynamic phase control functionality 112 determines an amount of phase shift compensation required for the individual switching cells based on the signals from the optical tap monitors 106. The phase shift compensation required as determined by the dynamic phase control functionality 112 can be applied to a switching cell through a phase compensating element, which may be located in the one, or both, of the arms of the MZI structure. The phase compensating element may be a thermo-optic (TO) element that uses a heater element to cause a temperature dependent phase shift according to an applied compensating voltage or current determined by the dynamic phase control functionality.

FIG. 1 depicts the switch 100 comprising the switching matrix 102 and the switch controller 108. The switching matrix 102 comprises a number of individual switching cells 104 that are individually controlled by the routing controller 110 in order to provide the required optical switching. The dynamic phase control functionality 112 monitors and controls the phase compensator in the individual switching cells in order to compensate for the phase errors induced by the individual switching cells. By compensating both the constant and dynamic phase errors for the individual switching cells, it is possible to increase the extinction ratio of the switching cells 104 and the switching matrix 102 as a whole.

Figure 2:
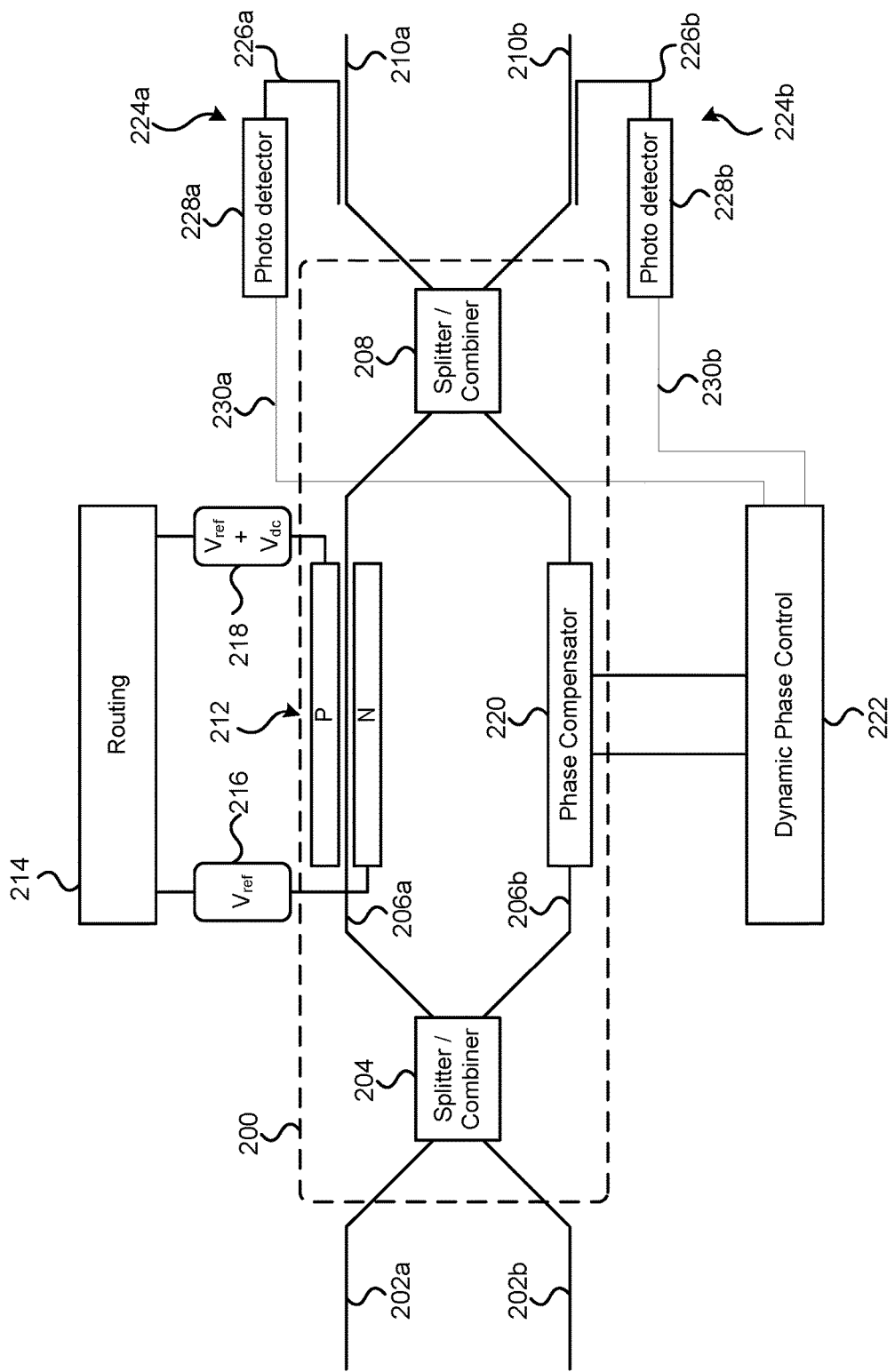
FIG. 2 depicts a dynamically compensated free-carrier effect based MZI switch cell.

FIG. 2 depicts an individual switching cell and associated control components. The switching cell 200 may be combined with other switching cells in a switch matrix of an optical switch, such as the switch matrix 102 of the optical switch 100 described above. The switching cell 200 comprises two inputs 202a, 202b (referred to collectively as inputs 202) coupled to a splitter/combiner 204. The splitter/combiner 204 may be configured as a 3 dB multi mode interferometer (MMI) coupler that evenly splits an incoming signal from either of the inputs 202 into first and second arms 206a, 206b (referred to collectively as arms 206) of the switching cell 200. A second splitter/combiner 208 is coupled to the two arms 206 of the switching cell 200. The second splitter/combiner 208 may also be an MMI coupler. The second splitter/combiner 208 can output an output signal to one of two outputs 210a, 210b (referred to collectively as outputs 210) depending upon a phase difference between the light in the two arms 206 of the switching cell 200. For example, if no relative phase shift is applied between the two lights in the arms 206, the splitter/combiner 208 may output 100% of the optical power to one output, e.g. the output 210a if input at the input 202b. If, however, a relative phase shift of π degrees is applied between the two signals in the arms 206, the splitter/combiner 208 may output 100% of the optical power to the other output 210b, for example. The switching 200 cell includes a PIN, or PN, junction 212 in the first arm 206a. By applying a voltage across the PIN junction 212, a phase shift is induced in the first arm 206a. By adjusting the voltage applied to the PIN junction 212, a phase shift, for example of 0 or π degrees without accounting for dynamic phase shift errors, may be induced in the optical signal in the arm in order to control which one of the outputs 210 the signal is switched to. The voltage applied to the PIN junction 212 may be provided by routing functionality 214 that determines if the switching cell should be in a cross or bar state. As depicted in FIG. 2, the routing functionality 214 may apply a reference voltage, $V_{ref}$, 216 to one side of the PIN junction 212 and a driving voltage 218, depicted as being provided by $V_{ref}+V_{dc}$, to the other side of the PIN junction 212.

While the routing functionality 214 allows the switching cell 200 to switch an optical signal at one of the inputs 202 to one of the outputs 210 by applying an appropriate voltage to the PIN junction in order to induce a phase shift, driving the PIN junction 212 results in dynamic phase shift errors, which may be based on temperature differences between the two arms 206a, 206b, as well absorption variations in the two arms 206a, 206b. The phase errors result in a reduction in the extinction ratio, also referred to as contrast ratio, of the switching cell. That is, when the routing functionality applies a voltage to provide a phase shift of π degrees, the dynamic phase errors that arise as a result of driving the PIN junction, an actual phase shift of π+Δφ degrees is provided. Accordingly, a dynamic phase error of Δφ may be induced in the optical signal as a result of driving the PIN junction to provide the desired phase shift of π degrees.

In order to compensate for these dynamic phase errors, and so increase the extinction ratio of the switching cell 200, a phase compensator 220 is located in one, or both, of the MZI arms 206. For example, in FIG. 2 the phase compensator 220 is depicted as being located in the second arm 206b. The phase compensator 220 is controlled by dynamic phase control functionality 222 to induce a phase shift in the optical signal in the second arm 206b to compensate for the dynamic phase error Δφ in the first arm 206a. If the phase compensator 220 is located in a different arm than the carrier-effect region, the phase shift compensation applied is the same as the phase shift error Δφ. If the phase compensator 220 is located in the same arm as the carrier-effect region, the phase shift compensation applied is the opposite of the phase shift error, namely −Δφ The phase compensator 220 may be a thermo-optic heater element that induces a phase shift based on a temperature change. Alternatively, the phase compensator 220 may be an electro-optic element, such as another PIN junction. Although using another PIN junction may induce corresponding dynamic phase errors when driving the compensating PIN junction to provide the compensating phase shift, these additional errors would be relatively small in comparison and as such may not need to be compensated for.

In order to determine the phase shift compensation to apply, the dynamic phase control functionality 222 receives signals indicative of the power of the optical signal in each output 210 of the switching cell 200. The signals may be provided by optical tap monitors 224a, 224b (referred to collectively as optical tap monitors 224) located at the outputs 210. Each of the optical tap monitors 224 comprise directional tap coupler 226a, 226b (referred to collectively as directional tap couplers 226) coupling the tapped light signal to photo detectors 228a, 228b (referred to collectively as photo detectors 228). The directional tap couplers 226 split a small portion, for example 1%-5%, of the light in the outputs 210. The photo detectors 228 convert the tapped light into corresponding electrical signals 230a, 230b indicative of the output power. The electrical signals 230a, 230b are provided to the dynamic phase control functionality 222, which uses the signals to determine and apply a dynamic phase compensation voltage to the phase compensator 220 thereby inducing a compensating phase shift to counteract dynamic phase shift errors resulting from driving the PIN junction to provide the required phase shift to switch the optical signal to the desired one of the outputs 210. Although not depicted in FIG. 1, the electrical signals 230a, 230b from the optical monitors 224 may also be provided to the routing functionality for use in determining the required switching signals required to provide the desired routing.

As described above, optical tap monitors 224 provide signals 230 indicative of the optical power in each of the outputs to the dynamic phase control functionality 222. The dynamic phase control functionality 222 uses the signals in order to determine the compensation phase shift required. Since an increase in the phase shift error worsens the contrast ratio between optical signals at the two outputs 210, the electrical signals 230 provide information on the phase shift error, which in turn is used to determine an amount of phase shift compensation to apply. The dynamic phase control functionality 222 controls the phase compensator 220 to compensate for the phase shift error, so that an accurate relative phase shift of π degrees is provided, even in the presence of dynamic phase errors resulting from driving a PIN junction to provide a relative phase shift of π degrees.

Figure 3:
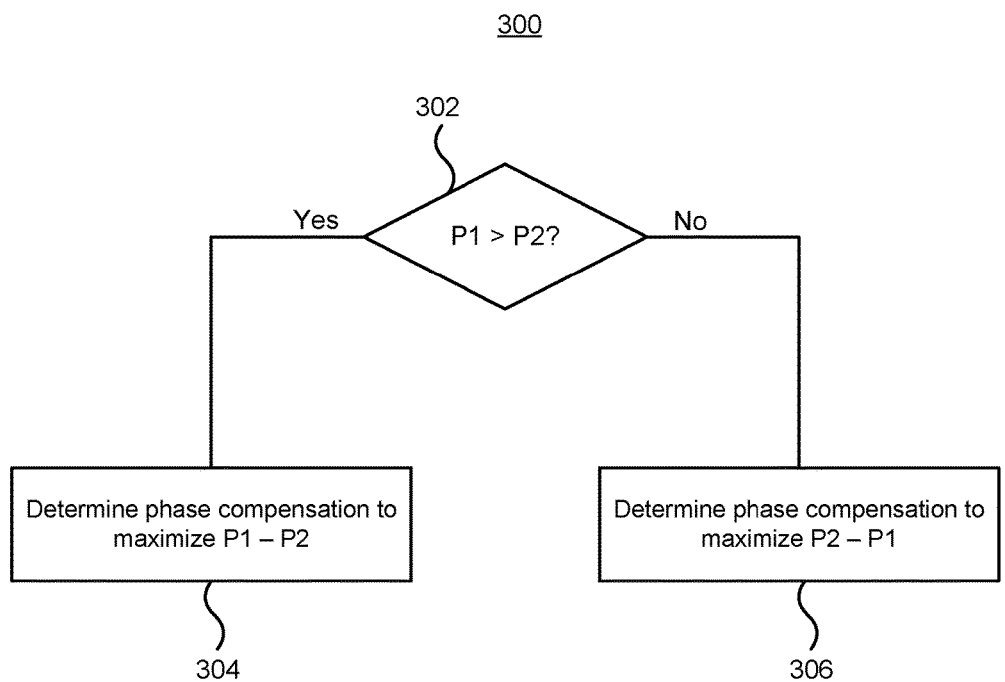
FIG. 3 depicts a method of dynamically compensating a phase-shift in a free-carrier effect based MZI switch.

FIG. 3 depicts a method of dynamically compensating a phase shift error in a free-carrier effect based MZI switch. The method 300 assumes that the dynamic phase errors to be compensated for a range of $-\pi/2 < \Delta\varphi < \pi/2$. The method 300 may be implemented in the dynamic phase control functionality 222 associated with an individual switching cell such as the switching cell 200 described above with reference to FIG. 2. The method 300 determines at a step 302 whether the power P1 of the optical signal in the first output is greater than the power P2 of the optical signal in the second output. An indication of the power P1 and P2 in the outputs is provided to the dynamic phase control functionality by the electrical signals from the optical tap monitors at each of the outputs in the switching cell, which is indicated by the electrical signal from the optical tap monitor associated with the first output. If the power P1 of the optical signal in the first output of the switching cell is greater than the power P2 of the optical signal in the second output (Yes at step 302), the phase compensation is determined at a step 304 that maximizes the difference of P1-P2 of the optical signals of the outputs. If the power P1 in the first output is not greater than the power P2 in the second output (No at step 302), then the phase shift compensation is determined at a step 306 that maximizes the difference of P2-P1.

The method 300 uses the optical tap monitors to provide feedback information that is used to dynamically compensate for phase shift errors in driving the PIN junction of the switching cell. The determined phase shift compensation is applied to a phase compensator which induces the determined phase shift to compensate for the error in the phase shift and as such, an actual relative phase shift of 0 or π degrees may be achieved. By compensating for the phase shift errors dynamically, the contrast ratio of a carrier effect based switching cell can be improved.

The method 300 assumes that the phase shift error to be compensated for is relatively small. For larger phase shift errors, for example phase shift errors outside the range of $-\pi/2$ to $\pi/2$, the compensation approach of method 300 may not always determine the correct compensation to apply to the phase error. Accordingly, a different approach may be required in order to determine the phase shift compensation to apply.

As described further below with reference to FIG. 5, in order to determine the correct phase compensation to apply even in the case of large phase errors information is used that provides an indication of what input is being switched to what output. This information could be provided in various ways. For example, the routing functionality 214 could provide the required information to the dynamic phase control functionality 222. Additionally or alternatively, as described further with reference to FIG. 4 additional optical tap monitors can be used to determine the input and the output.

Figure 4:
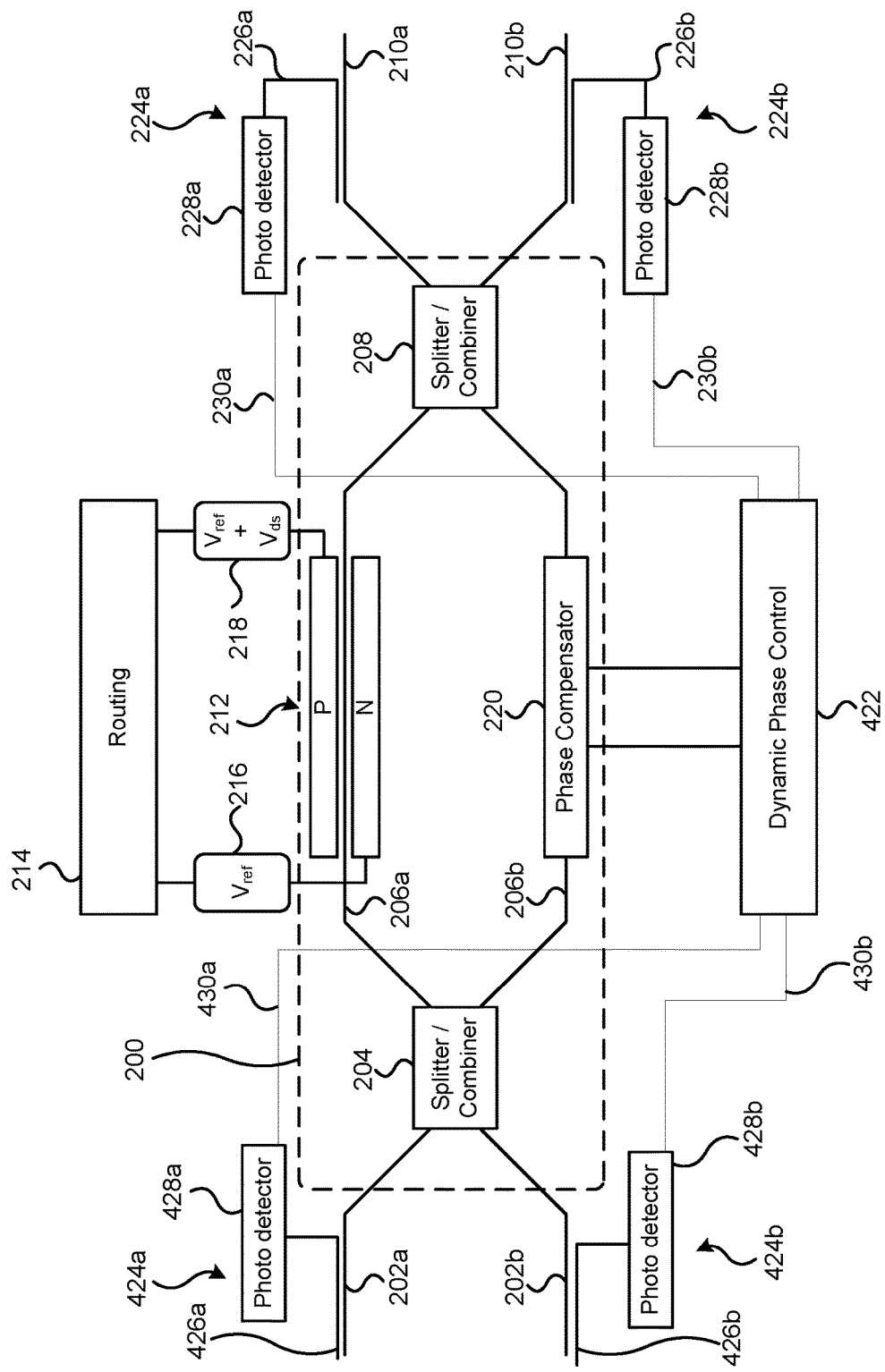
FIG. 4 depicts a further dynamically compensated free-carrier effect based MZI switch.

FIG. 4 depicts a further individual switching cell and associated control components. The switching cell 200 depicted in FIG. 4 is the same as described above with reference to FIG. 2. In contrast to FIG. 2, in which optical tap monitors 224 were associated with the outputs 210 of the switching cell 200, in FIG. 4 additional optical tap monitors 424a, 424b (referred to collectively as additional optical tap monitors 424) are associated with the inputs 402. The additional optical tap monitors 424 are similar to the optical tap monitors 224 described above with reference to FIG. 2 and comprise directional tap couplers 426a, 426b (referred to collectively as directional tap couplers 426) coupled to photo detectors 428a, 428b (referred to collectively as photo detectors 428). The directional tap couplers 426 split a small portion, for example 1%-5%, of the optical signal in the inputs 202. The photo detectors 428 convert the tapped optical signal into corresponding electrical signals 430a, 430b indicative of the input power.

The dynamic phase control functionality 422 receives the signals from the optical tap monitors 224 at the switching cell's outputs 210 and the additional optical tap monitors 424 at the inputs 202. The dynamic phase control 422 uses the signals to determine which one of the inputs 202 is being switched to which one of the outputs. The dynamic phase control functionality 422 may receive additional information, for example from the routing functionality, that provides an indication of the state of the switching cell 200, that is whether the switching cell is in a cross or bar state. Using the input information provided by the additional optical tap monitors 424 and the switching cell state information, the dynamic phase control functionality 422 can determine which of the outputs should have the output signal. For example, if the top input, 202a has a signal present, and the switching cell is in the bar state, the optical signal should be switched to the top output 210a. Accordingly, the phase error compensation attempts to maximize the power at the optical tap monitor 224a associated with the determined output 210a or minimize the power at the optical tap monitor 224b associated with the determined output 210b.

Figure 5:
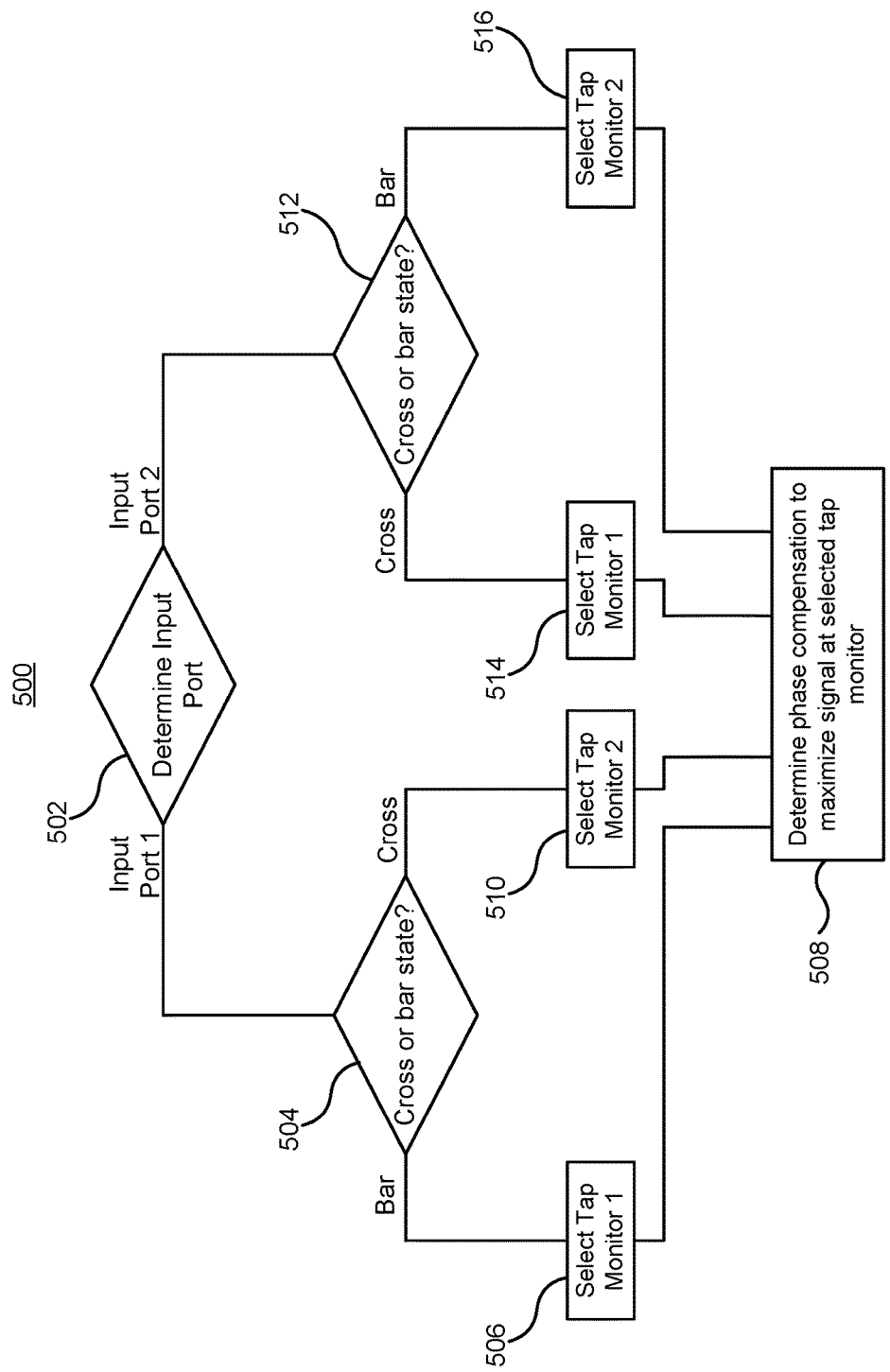
FIG. 5 depicts a further method of dynamically compensating a phase-shift in a free-carrier effect based MZI switch.

FIG. 5 depicts a further method of dynamically compensating a phase shift in a free-carrier effect based MZI switch. The method 500 can dynamically compensate for large phase shift errors, including phase shift errors outside the range of $-\pi/2$ to $\pi/2$. The method 500 may be performed by dynamic phase control functionality of a switch or switching cell, such as the dynamic phase control functionality 422 of switching cell 200. The method 500 begins with determining which one of the input ports is being switched at a step 502. The determination of which input port the optical signal is present at can be determined either from information from the routing functionality, or from the signals of the optical tap monitors associated with the inputs. The input port may be the port that has the highest powered signal, as determined from the optical tap monitor signals. If the input port is the first port (Input Port 1 at step 502) the method determines whether the switching cell is in the cross or bar state at a step 504. If the switching cell is in the bar state (Bar at step 504), the optical tap monitor associated with the first output, that is the output the first input is switched to when in the bar state, is selected at a step 506. Once the optical tap monitor is selected, the phase shift compensation required to maximize the power of selected optical tap monitor is determined at a step 508. If at the step 504 it is determined that the switching cell is in the cross state (Cross at 504), the optical tap monitor associated with the second output, that is the output the first input is switched to when in the cross state, is selected at a step 510. With the second optical tap monitor selected, the phase shift compensation that maximizes the power at the selected optical tap monitor is determined at the step 508. If at step 502 it is determined that the input port is the second input port (Input Port 2 at step 502), the method determines if the switching cell is in the cross or bar state at a step 512. If the switching cell is in the cross state (Cross at step 512), the first optical tap monitor is selected at a step 514 and the phase shift compensation that maximizes the power at the selected optical tap monitor is determined at the step 508. If however, the switching cell is in the bar state (Bar at step 516), the second optical tap monitor is selected at a step 516 and the phase shift compensation that maximizes the power at the selected optical tap monitor is determined at the step 508.

Although the above has described the dynamic compensation as maximizing signals, it will be appreciated that the compensation does not need to fully maximize the signals, but may only increase the signal.

As described above, photo detectors are used to monitor an output contrast ratio of a carrier effect based MZI switch. The photo detector signals may be sent to a dynamic phase controller that determines a phase shift compensation to apply. The dynamic phase shift compensation may be time varying with a time constant that is shorter than a hold-time of the photonic switch. The phase shift compensation can be applied by a thermo optic (TO) phase shifter within the MZI switch. The determined phase compensation can compensate both constant phase shift errors, resulting from non-ideal fabrication variations of the MZI switch, as well as dynamic phase shift errors resulting from driving the PIN, or PN junction of the MZI switch. The dynamic compensation described above allows the MZI switch to induce an actual phase shift of $\pi$ degrees in order to maximize an extinction ratio of the MZI switch.

Although the above has described a dynamic compensation process for a carrier-effect based MZI switch, it is possible to apply the same dynamic compensation to non-carrier effect based switches, such as TO switches. However, TO switches do not have PIN junctions and as such the dynamic phase errors resulting from driving the PIN junction are not present and as such the TO switches may not benefit as much from the dynamic phase compensation as the carrier-effect based switches. Further, although the above has described a single drive switching cell, that is a switching cell that has a PIN or PN junction in a single one of the two arms, it is possible for the dynamic phase compensation to be applied to dual drive switching cells that have PIN junctions, or TO phase shifters, in both arms of the MZI switch. Similarly, although the phase compensator is described as a TO phase shifter it may be provided as a separate carrier-effect based phase shifter. Further, the phase compensator is depicted as being provided in a different arm from the phase shifter for switching, it possible for the phase compensator to be provided in the same arm of the MZI switch.

The present disclosure provided, for the purposes of explanation, numerous specific embodiments, implementations, examples and details in order to provide a thorough understanding of the invention. It is apparent, however, that the embodiments may be practiced without all of the specific details or with an equivalent arrangement. In other instances, some well-known structures and devices are shown in block diagram form, or omitted, in order to avoid unnecessarily obscuring the embodiments of the invention. The description should in no way be limited to the illustrative implementations, drawings, and techniques illustrated, including the exemplary designs and implementations illustrated and described herein, but may be modified within the scope of the appended claims along with their full scope of equivalents.

While several embodiments have been provided in the present disclosure, it should be understood that the disclosed systems and components might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

What is claimed is:

1. A method of compensating phase shift errors in a carrier effect based switching cell, the method comprising:
   applying an amount of phase shift compensation to a phase compensator of the switching cell to compensate for phase shift errors in the switching cell, the amount of phase shift compensation being determined in accordance with:
      maximizing a difference between a first optical power level of an optical signal at a first output of the switching cell and a second optical power level of the optical signal at a second output of the switching cell when the first optical power level is greater than the second optical power level; and maximizing a difference between the second power level and the first power level when the second optical power level is greater than the first power level.

2. The method of claim 1, further comprising:
   selecting an optical tap monitor associated with an output determined to be active, the selected optical tap monitor detecting the first optical power level,
   wherein the amount of phase compensation to apply is further determined in accordance with:
      maximizing the detected first optical power level.

3. The method of claim 2, wherein determining which output is active comprises:
   determining an input being switched;
   determining a state of the switching cell; and
   determining which output is active based on the determined input and the state of the switching cell.

4. A method of compensating phase shift errors in a carrier effect based switching cell, the method comprising:
- detecting a first power level of an optical signal at a first output of the switching cell;
- detecting a second power level of an optical signal at a second output of the switching cell;
- determining an amount of phase shift compensation to apply based on the detected first power level of the optical signal at the first output; and
- applying the determined amount of phase shift compensation to a phase compensator of the switching cell to compensate for phase shift errors in the switching cell,
- wherein determining the amount of phase shift compensation to apply further includes:
  - determining if the first power level is greater than the second power level, determining the amount of phase shift compensation to apply for increasing a difference between the first power level and the second power level when the first power level is greater than the second power level, and
  - determining the amount of phase shift compensation to apply for increasing a difference between the second power level and the first power level when the first power level is not greater than the second power level;
- wherein increasing the difference between the first power level and the second power level comprises maximizing the difference between the first power level and the second power level and increasing the difference between the second power level and the first power level comprises maximizing the difference between the second power level and the first power level.

5. The method of claim 1, wherein the determined amount of the phase shift compensation is applied to at least partially compensate for phase errors resulting from driving a carrier effect region of the switching cell, whereby an extinction ratio (ER) of the photonic switching cell increases.

6. The method of claim 1, wherein the applying the determined amount of the phase shift comprises adjusting temperature of a thermo-optic (TO) phase shifter.

7. The method of claim 1, wherein a time-varying compensating signal has a time constant that is shorter than a hold-time of the switching cell.

8. The method of claim 1, wherein the determined amount of the phase shift compensation is applied to at least partially compensate for phase shift errors resulting from driving a PN junction of the switching cell, whereby an extinction ratio (ER) of the switching cell increases.

9. The method of claim 8, wherein the determined amount of the phase shift compensation is applied to at least partially compensate for phase shift errors resulting from at least one of a phase imbalance of an input coupler of the switching cell and a phase error from a waveguide of the switching cell due to fabrication variations.

* * * * *